United States Patent
Pearce (10) Patent No.: US 11,387,767 B2
(45) Date of Patent: Jul. 12, 2022

(54) METHOD AND APPARATUS FOR THE SAFE LIMITATION OF MOTOR TORQUE IN A THREE-PHASE DRIVE

(71) Applicant: KOLLMORGEN CORPORATION, Radford, VA (US)

(72) Inventor: Robert Pearce, Bristol (GB)

(73) Assignee: Kollmorgen Corporation, Radford, VA (US)

(*) Notice: Subject to any disclaimer, the term of this patent is extended or adjusted under 35 U.S.C. 154(b) by 0 days.

(21) Appl. No.: 16/926,244

(22) Filed: Jul. 10, 2020

(65) Prior Publication Data
US 2021/0021226 A1 Jan. 21, 2021

Related U.S. Application Data

(60) Provisional application No. 62/875,320, filed on Jul. 17, 2019.

(51) Int. Cl.
| | |
|---|---|
| *G01R 31/34* | (2020.01) |
| *H02P 29/024* | (2016.01) |
| *H02H 7/08* | (2006.01) |
| *H02P 21/00* | (2016.01) |
| *H02P 27/06* | (2006.01) |

(52) U.S. Cl.
CPC ......... *H02P 29/027* (2013.01); *H02H 7/0833* (2013.01); *H02P 21/00* (2013.01); *H02P 27/06* (2013.01)

(58) Field of Classification Search
CPC ........ H02P 29/027; H02P 21/00; H02P 27/06; H02H 7/0833; G01R 31/34
See application file for complete search history.

(56) References Cited

U.S. PATENT DOCUMENTS

| | | |
|---|---|---|
| 5,896,257 A | 4/1999 | Takahashi |
| 7,737,652 B2 | 6/2010 | Schwesig |
| 10,060,983 B2 | 8/2018 | Mayrhofer |

(Continued)

OTHER PUBLICATIONS

W. Leonhard: Control of Electrical Drives, Springer-Verlag, 1985, ISBN 3-540-13650-9, Chapter 14, pp. 260-270. (7 pages).

(Continued)

*Primary Examiner* — Cortez M Cook
(74) *Attorney, Agent, or Firm* — Day Pitney LLP; Anthony A. Kassas (57) ABSTRACT

A torque-limiting safety circuit servo drive for AC permanent magnet motors including a three-phase inverter bridge, a first current sensor in series with a first motor phase, a second current sensor in series with a second motor phase, a third current sensor in series with the DC bus, and a drive control circuit that controls the six pulse-width modulated gate drive signals for the three-phase inverter bridge. The drive circuit has first and second safety channel STO inputs whereby either channel can shut down the three-phase inverter bridge, emits a signal set to represent the switching state of the three-phase inverter bridge, and modifies the switching pattern of the PWM to ensure the dwell times of PWM is sufficiently long to allow a valid measurement of phase current using the bus current sensor. First and second safety processors controls the first and second safety channel STO inputs, respectively.

12 Claims, 6 Drawing Sheets

(56) References Cited

U.S. PATENT DOCUMENTS

2016/0377682 A1* 12/2016 Mayrhofer ............. G01R 31/34
                                                     324/765.01
2017/0070179 A1*  3/2017 Yamada ................. H02M 1/32

OTHER PUBLICATIONS

W. Leonhard: Control of Electrical Drives, Springer-Verlag , 1985, ISBN 3-540-13650-9, "Equation 10.4a", p. 151. (1 page).
J.T. Boys: "Novel current sensor for PWM AC drives," Proc. Inst. Elect. Eng. B, vol. 135, pp. 27-32, 1988. (6 pages).
International Search Report and Written Opinion issued in corresponding international application No. PCT/US2020/041637, dated Oct. 2, 2020. (13 pages).
Anonymous: "Active Cube Application manual—Safe Torque Off", Bonfiglioli Vectron, pp. 1-30, Mar. 1, 2011. (30 pages) [Retrieved from Internet, Apr. 16, 2019] URL: http://opis.cz/vectron/pdf/active_cube/acu-sto-v1-01sv2-03_en-vec541r2.pdf.

* cited by examiner

$$i_{channel\_A} = \frac{3}{2}i_U + j\frac{\sqrt{3}}{2}(i_U + 2i_V) = \frac{3}{2}i_{307} + j\frac{\sqrt{3}}{2}(i_{307} + 2i_{308})$$

FIG. 5 PRIOR ART

| | State (binary) | Inverter bridge state | | | | | | Current sensed at 306 |
|---|---|---|---|---|---|---|---|---|
| | | IGBT 321 | IGBT 322 | IGBT 323 | IGBT 331 | IGBT 332 | IGBT 333 | |
| Current Measuring States | $100_2$ | ON | OFF | OFF | OFF | ON | ON | $+i_U$ |
| | $110_2$ | ON | ON | OFF | OFF | OFF | ON | $-i_W$ |
| | $010_2$ | OFF | ON | OFF | ON | OFF | ON | $+i_V$ |
| | $011_2$ | OFF | ON | ON | ON | OFF | OFF | $-i_U$ |
| | $001_2$ | OFF | OFF | ON | ON | OFF | OFF | $+i_W$ |
| | $101_2$ | ON | OFF | ON | OFF | ON | OFF | $-i_V$ |
| 0V States | $111_2$ | ON | ON | ON | OFF | OFF | OFF | 0 |
| | $000_2$ | OFF | OFF | OFF | ON | ON | ON | 0 |

FIG. 6 PRIOR ART $$i_{channel\_B} = \frac{3}{2}i_U + j\frac{\sqrt{3}}{2}(i_V - i_W)$$

| Feature | Preferred Embodiment | | | |
|---|---|---|---|---|
| | 1st | 2nd | 3rd | 4th |
| Re-construct current vector from the bus current and IGBT state | ✓ | | | |
| Check the appropriate phase current against the bus current | | ✓ | | ✓ |
| Signed limitation of torque using safe encoder | ✓ | ✓ | | |
| Unsigned limitation of torque from magnitude of current vector | | | ✓ | ✓ |

FIG. 10

METHOD AND APPARATUS FOR THE SAFE LIMITATION OF MOTOR TORQUE IN A THREE-PHASE DRIVE

RELATED APPLICATIONS

This application claims the benefit of priority to U.S. provisional patent application Ser. No. 62/875,320, filed on Jul. 17, 2019. The content of the referenced patent application is incorporated herein by reference in its entirety for any purpose whatsoever.

BACKGROUND OF THE INVENTION

1. Field of the Invention

This invention is directed toward motor driven shafts found in automated machinery, robots, and other electrically driven equipment. In such equipment it may be necessary to limit the torque or force exerted by the motor in order to avoid damage to personnel or equipment. This invention is equally applicable to rotary permanent magnet synchronous motors or linear permanent magnet synchronous motors.

2. State of the Art

Machinery manufactured in the European Union is now required to demonstrate safety against injury by the application of the standards IEC62061 and ISO 13849 and related standards which, in order to mitigate risk, and consistent with the philosophy of Functional Safety, require the torque exerted by the motor to be limited a fail-safe manner; this is termed Safely Limited Torque, hereafter termed 'SLT', as defined in the standard IEC 61800-5-2.

The practice and terminology of functional safety will be briefly reviewed. The process sub-system is that part of the drive not related to functional safety. 'Safe Torque Off, hereafter termed STO', means a safety control function that prevents the generation of torque in a motor-drive subsystem. Therefore 'putting the drive in STO' means that the safety sub-system is disabling the drive. A 'Hardware Fault Tolerance', or simply 'HFT', of N means that N+1 faults could cause a loss of the safety-related control function. One-out-of-two, written 1oo2, indicates a two-channel safety scheme with HFT=1. 'Probability of dangerous Failure per Hour', or simply $PFH_D$, is the average probability of a dangerous failure per hour of a safety related system or sub-system to perform the specified safety function. 'Safety Integrity Level', hereafter termed 'SIL', means the probability of a safety control system or sub-system satisfactorily performing the required safety-related control functions under all stated conditions lies within a prescribed range. IEC62061 defines three levels of SIL; SIL1 which has a $PFH_D$ in the range $\geq 10^{-6}$ to $<10^{-5}$, SIL2 which has a $PFH_D$ in the range $\geq 10^{-7}$ to $<10^{-6}$ and SIL3 which has a $PFH_D$ in the range $\geq 10^{-8}$ to $<10^{-7}$ and is the most stringent. Note that in addition to these $PFH_D$ requirements, each SIL also has 'architectural requirements', namely each SIL must be realized by certain prescribed structures, as set out in table 5 of IEC 62061. Further architectural requirements may be imposed by other machinery standards such as the robotics safety standard ISO 10218 which requires at least SIL2 and HFT=1 for all safety functions. In practice therefore, a safety sub-system that implements Safely Limited Torque must have two channels. Redundancy is a key concept in the implementation of functional safety, in a two-channel system one of the channels is effectively a redundant channel that is present so that, in the event of a discrepancy between the two channels, voting logic will put the system into a safe state using STO. The channels of a two-channel safety system can be realized with identical hardware or they can use different hardware and this is advantageous as it reduces common cause failures by adding diversity to the safety sub-system. The term 'Black Channel' in communication means transmitting safety-related information through non-safe hardware in a reliable fashion by using additional checking measures in the communication protocol. 'Diagnosis' is the automatic testing of a safety channel and includes the checking of a first safety channel by a second safety channel. 'Fault Reaction' is the action taken by the safety sub-system when the process sub-system exceeds a prescribed safe limit or when an internal fault has been detected within the safety sub-system itself. In sectors such as aviation, the fault reaction of the safety sub-system is to cause a back-up control system to operate: this is called 'fail to operational'. However in the machinery sector the fault reaction is to shut-down at least part of the machine using STO and thus render it safe; the fault reaction is said to be 'fail-safe'. Finally, it should be noted that functional safety places constraints on how the product is conceived, designed, tested and maintained; these safe processes are in addition to ordinary engineering practices.

In a permanent magnet synchronous motor, torque is produced by the product of the vector of current and the vector of flux. LEONHARD ("Control of Electrical Drives" ISBN-3: 540-13650-9) represents this in his equation (14.4) and this can be equivalently expressed as: the motor torque is proportional to the sine of the angle between the rotor flux vector and the stator current vector multiplied by the magnitude of the rotor flux vector and the magnitude of stator current vector. The reader may refer to LEONHARD chapter 14.1 for a full explanation of the control of permanent magnet AC servo motors.

DESCRIPTION OF THE RELATED ART

There are four reasons for measuring current in a servo drive: firstly, to commutate the motor and perform closed-loop control of the motor torque; secondly, to protect the power electronics from excessive peak currents that might arise from a fault in the motor or motor cable; thirdly, to operate the motor windings and drive electronics within their thermal limits; and fourthly, to implement safely limited torque.

Figure 1:
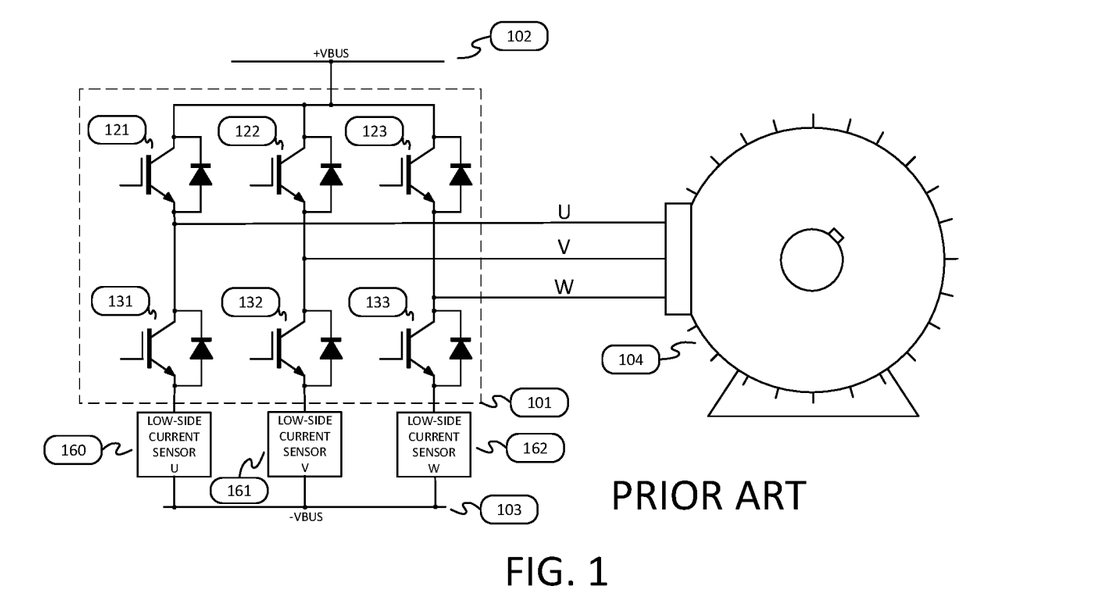
FIG. 1 is a schematic illustration of an AC servo motor power stage and motor showing a current sensor placed in series with the emitter of each of the low side IGBTs in accordance with the prior art.
Figure 2:
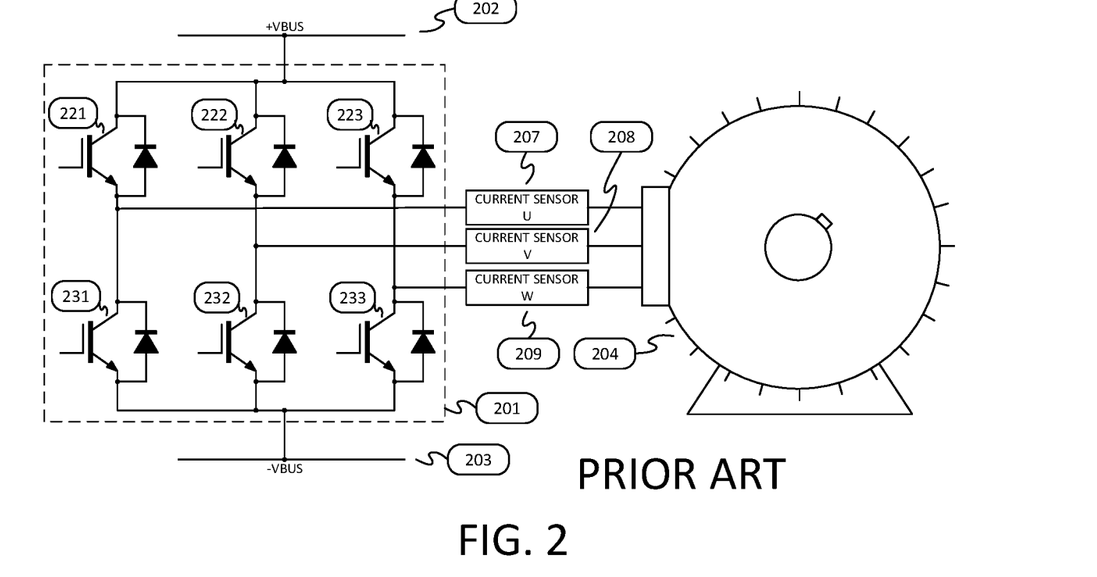
FIG. 2 is a schematic illustration of an AC servo motor power stage and motor showing a first typical set of possible positions for sensing current; all three motor phases are explicitly sensed in accordance with the prior art.
Figure 3:
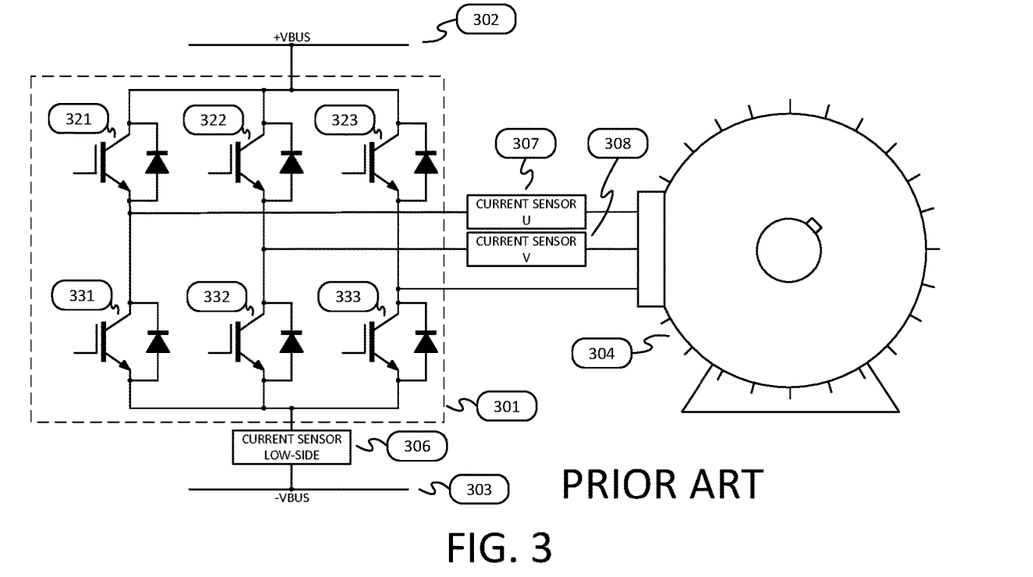
FIG. 3 is a schematic illustration of an AC servo motor power stage and motor showing a second typical set of possible positions for sensing current; two motor phases are explicitly sensed and there is a low-side DC link current sensor in accordance with the prior art.

FIG. 1, FIG. 2 and FIG. 3 show typical sets of locations for current sensors that are found in servo drives offered on the market today.

In FIG. 1 there are current sensors 160, 161 and 162 in series with each of the low side IGBTs of inverter bridge 101. The term IGBT in this document simply means 'semiconductor switch' and could equally be a power MOSFET or similar device. The pair of IGBTs in a phase leg are switched in a complementary fashion, thus when low side IGBT 131 is ON then high side IGBT 121 is off and vice-versa. Consider sensor 160, when its respective low side IGBT 131 is ON then the current in sensor 160 is representative of the U phase current. Sensors 161 and 162 can similarly sense the V and W phase currents when the respective low side IGBTs are ON. Therefore, when all three low-side IGBTs 131, 132, 133 are ON simultaneously then the respective current sensors 160, 161, 162 simultaneously provide valid measurements of the U, V and W phase currents.

An advantage of the scheme of FIG. 1 is that the current sensors 160, 161 and 162 can be resistors and, if the drive control circuit (not illustrated) is also referred to the negative bus 103. then there is no requirement for level translation; therefore the current sensing scheme of FIG. 1 is low cost.

There are drives, particularly low voltage drives, on the market using the current sensing arrangement of FIG. 1, however there are reasons why the current sensing arrangement of FIG. 1 is not widely used, particularly at high bus voltages. One reason is that packaged IGBT inverter bridges such as type FP150R12KT4 from Infineon Semiconductor do not allow the connection of a sensor in series with the emitter of each low side IGBT. A second reason is that the phase currents must be sampled when the low-side IGBTs are ON whereas current measurements that are continuously valid are preferred for the purposes of both current control and over-current protection.

In FIG. 2 there are current sensors 207, 208 and 209 in series with U, V and W phase currents flowing into the motor 204. The current sensors 207, 208 and 209 allow both the calculation of the stator current vector, hereafter termed 'current vector', and the detection of fault currents that would arise from a short-circuit to chassis. The phase current sensors 207, 208 and 209 are typically each implemented as a resistor in combination with a voltage isolation circuit, or alternatively for higher current drives, as DC current transformers. Both types of sensor circuit are of a size and cost that is significant in relation to the product as a whole; therefore there is commercial pressure to use fewer sensors of this type.

The sum of the motor phase currents is zero and therefore the current vector can be calculated from just two of the phase currents and thus it is sufficient to use only two current sensors, say 207 and 208 for closed-loop control of the motor currents. Therefore FIG. 3 has only two current sensors 307 and 308 to monitor the current in the U and V motor phases. The DC link current is also measured at 306 because it is necessary to protect the W phase current against short-circuit currents that are not detected by sensors 307 and 308. The measurement from 306 is used solely to switch off the gate drives to the IBGT module 301, this action does not require isolation with respect to the gate driver circuit (not illustrated) for the IBGT module 301 and therefore the over-current protection circuit (not illustrated) can be referenced to the negative voltage bus 303: in other words using a current sensor 306 in the negative DC bus 303 is a cost-effective way of protecting the IGBT inverter bridge 201 against fault currents. TAKAHASHI (U.S. Pat. No. 5,896,257) teaches a scheme for the measurement of phase current that measures the sum of the U and V currents, thereby measuring the W phase current using $i_w=-i_u-i_v$, and the sum of the V and W currents, thereby measuring the U phase current using $i_u=-i_w-i_v$, using special DC current transformers having two primary windings that can thereby sense the sum of two currents. This technique is applicable to a variant of FIG. 3 but in the interests of brevity it will not be described further.

The prior art of Safely Limited Torque will be briefly reviewed. For accurate limitation of torque, with the option of different positive and negative limit values, it is necessary for the drive electronics to know the position and magnitude of the current vector and the position and magnitude of the rotor flux vector—hereafter termed 'flux vector'. For an AC permanent magnet servo that has surface magnets, the flux vector is aligned with the rotor magnets and therefore the position of the rotor within an electrical turn can be used to indicate of the angle of the flux vector. The magnitude of the flux vector is set during the magnetizing process as part of manufacture and therefore the position of the rotor is indicative of both the angle and the amplitude of the rotor flux vector.

An AC permanent magnet servo that has interior magnets has a rotor flux vector that results from the sum of the flux vector from the magnets and a contribution form the stator current vector. Thus there is additional computational complexity when calculating the flux vector for an interior magnet motor but no additional quantities need to be measured over those required for torque estimation for surface magnet motors. This invention applies equally to both types of motor.

It is an architectural requirement of safety standard ISO 10218 ("Safety requirements for industrial robots") and is preferred in safety standard ISO 13849-1 ("Safety of machinery—Safety-related parts of control systems") that in the safety sub-system shall be two-channel, including the measurement of the rotor position and current vector.

A two-channel measurement of the rotor position can be performed using a two-channel encoder rated for functional safety at SIL2 or above. It is alternatively and equivalently possible to monitor two encoders of safety rating SIL1 to achieve safe position monitoring to SIL2.

Figure 4:
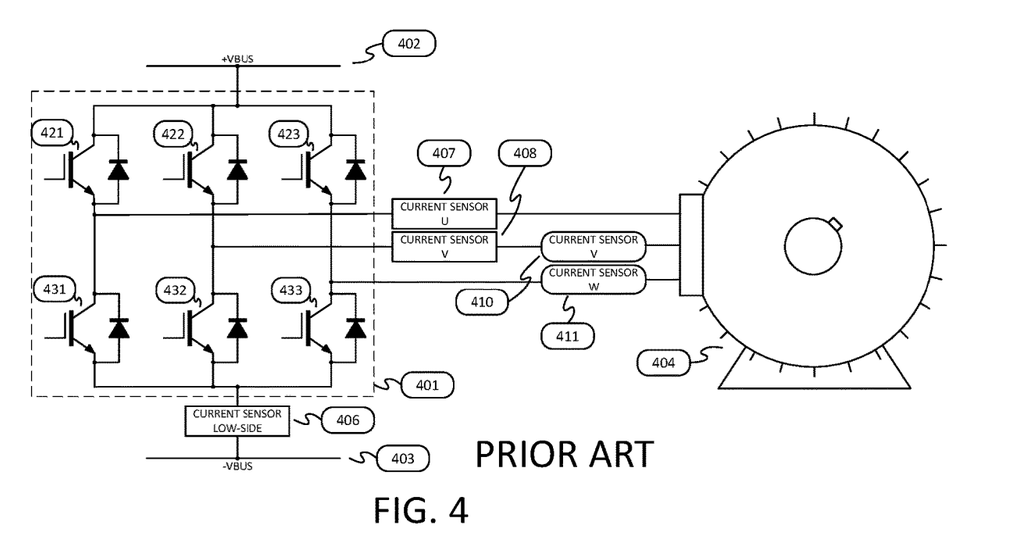
FIG. 4 is a schematic illustration of an AC servo motor power stage and motor showing a possible set of positions for sensing current with duplication to implement safely limited torque in accordance with the prior art.

A two-channel current vector measurement can be implemented using a duplicated set of sensors, for example by elaborating the prior art of FIG. 3 to include a further, redundant, pair of phase current sensors 410 and 411 into the prior art of FIG. 4. The main disadvantage of this implementation is that it requires inclusion of further current sensors with their attendant size and cost penalties.

A two-channel current vector measurement can alternatively be implemented by making a measure of all three phase currents as shown in FIG. 2 and making use of the identity this is the method of SCHWESIG (U.S. Pat. No. 7,737,652). In effect, the two current measurements are treated by the safety sub-system as a first channel and second channel is constructed from different pairs of phase currents. SCHWESIG teaches an implementation of SLT using the current measurement scheme of FIG. 2 in combination rotor position measurements and other items. In brief, SCHWESIG calculates the product of the current vector and flux vector, this is done twice as a part of a two-channel safety sub-system wherein a disparity between the two computed values of torque shut down the drive using safe torque-off (STO). If the calculated torque exceeds the threshold value, then the drive is shut down using STO. SCHWESIG measures current in the manner of FIG. 2 but it would be advantageous in respect of both size and cost to implement safely limited torque (SLT) in the manner of FIG. 3, namely to do so with the minimum, cheapest set of current sensors that is already present to protect the IGBT module.

The technique of SCHWESIG is adaptable to the current monitoring scheme of FIG. 1 by computing first and second torque values when the low side IGBTs are all ON simultaneously.

BOYS ("Novel current sensor for PWM AC drives," Proc. Inst. Elect. Eng. B, vol. 135, pp. 27-32, 1988) teaches a technique for inferring the three phase currents from the current returning to negative link 303 using just a single current sensor 306. Note that there is a variable delay between the current measurement and the subsequent application of voltage; for this reason and because of the two abnormal conditions described below this technique is seldom used for closed loop control.

SUMMARY OF THE INVENTION

A torque-limiting safety circuit servo drive for AC permanent magnet motors is provided including a three-phase inverter bridge, a first current sensor in series with a first motor phase, a second current sensor in series with a second motor phase, a third current sensor in series with the DC bus, and a drive control circuit that controls the six pulse-width modulated gate drive signals for the three-phase inverter bridge. The drive circuit has first and second safety channel STO inputs whereby either channel can shut down the three-phase inverter bridge. The drive circuit emits a signal set to represent the switching state of the three-phase inverter bridge. The drive circuit modifying the switching pattern of the PWM so as to ensure that the dwell times of pulse-width modulation are sufficiently long to allow a valid measurement of phase current using the bus current sensor. A first safety processor controls the first safety channel STO input of the drive control circuit, and a second safety processor controlling the second safety channel STO input of the drive control circuit.

A torque-limiting safety circuit is further provided including a current vector re-constructor circuit wherein the current vector re-constructor circuit is supplied by the drive control circuit with a signal set representing the switching state of the three-phase inverter bridge, the current vector re-constructor circuit is further supplied with a signal representing the DC link current from the third current sensor, the current vector re-constructor constructs and second redundant estimated current vector, the current vector re-constructor circuit emits a signal set representing the estimated current vector and an error indication that confirms that the current vector estimate is valid. The first safety processor is supplied with the first phase current measurement and the second phase current measurement, wherein the first safety processor computes the motor torque and shuts down the three-phase inverter bridge using the first safety channel STO input of the drive control circuit when the motor exceeds a prescribed limit value. The second safety processor is supplied with the redundant estimated current vector and its related error indication, wherein the second safety processor computes the motor torque and shuts down the three-phase inverter bridge using the second safety channel STO input of the drive control circuit when the motor torque exceeds the prescribed limit value.

A torque-limiting safety circuit is further provided including a rotor position sensor sub-system that emits two independent measurements of position wherein the first safety processor is further supplied with a first measurement of rotor angle whereby, in combination with its respective computed current vector, it computes a signed value of motor torque and shuts down the three-phase inverter bridge using the first safety channel STO input of the drive control circuit when the motor torque exceeds either a prescribed positive limit value or a prescribed negative limit value. The second safety processor is further supplied with a second measurement of rotor angle whereby, in combination with its respective computed current vector, it computes a signed value of motor torque and shuts down the three-phase inverter bridge using the second safety channel STO input of the drive control circuit when the motor torque exceeds either the prescribed positive limit value or the prescribed negative limit value.

A torque-limiting safety circuit is further provided including a first current vector calculator and error detector circuit and a first current vector calculator and error detector circuit wherein a first current vector calculator and error detector circuit monitors the signal from the first phase current sensor, the signal from the second phase current sensor, the signal from the third current sensor in series with the DC bus. The signal set represents the switching state of the three-phase inverter bridge and thereby computes the current vector which it supplies as a signal set to the first safety processor. The first current vector calculator compares the signal from the third current sensor in series with the DC bus against the first or second phase current sensor as guided by the signal set representing switching state of the three-phase inverter bridge and by this means supplies a fault signal to the first safety processor denoting a discrepancy in the current measurement, thereby causing the first safety processor to shut down the drive using the first safety channel STO input. A second current vector calculator and error detector circuit monitors the signal from the first phase current sensor, the signal from the second phase current sensor, the signal from the third current sensor in series with the DC bus, the signal set representing the switching state of the three-phase inverter bridge and thereby computes the current vector which it supplies as a signal set to the second safety processor. The second current vector calculator compares the signal from the third current sensor in series with the DC bus against the first or second phase current sensor as guided by the signal set representing switching state of the three-phase inverter bridge and by this means supplies a fault signal to the second safety processor denoting a discrepancy in the current measurement, thereby causing the second safety processor to shut down the drive using the second safety channel STO input. The first safety processor is supplied with the first phase current measurement from the first current vector calculator, wherein the first safety processor computes the motor torque and shuts down the three-phase inverter bridge using the first safety channel STO input of the drive control circuit when the motor exceeds a prescribed limit value. The second safety processor is supplied with the second phase current measurement from the second current vector calculator, wherein the second safety processor computes the motor torque and shuts down the three-phase inverter bridge using the first safety channel STO input of the drive control circuit when the motor torque exceeds the prescribed limit value.

A torque-limiting safety circuit is further provided including a rotor position sensor sub-system that emits two independent measurements of position wherein the first safety processor is further supplied with a first measurement of rotor angle whereby, in combination with its respective computed current vector, it computes a signed value of motor torque and shuts down the three-phase inverter bridge using the first safety channel STO input of the drive control circuit when the motor torque exceeds either a prescribed positive limit value or a prescribed negative limit value. The second safety processor is further supplied with a second measurement of rotor angle whereby, in combination with its respective computed current vector, it computes a signed value of motor torque and shuts down the three-phase inverter bridge using the second safety channel STO input of the drive control circuit when the motor torque exceeds either the prescribed positive limit value or the prescribed negative limit value.

BRIEF DESCRIPTION OF THE DRAWINGS

The features and advantage of the invention are apparent from the following description taken in conjunction with the accompanying drawings in which.

DETAILED DESCRIPTION OF THE INVENTION

Figure 5:
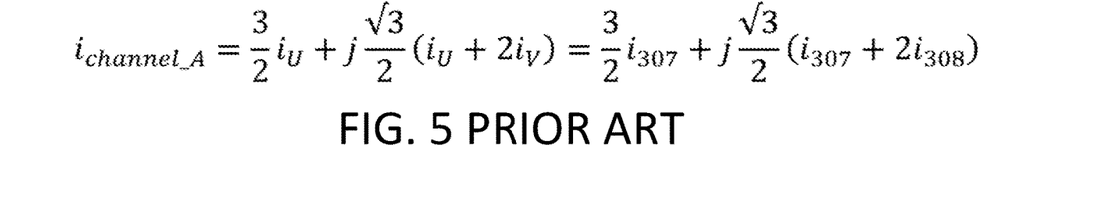
FIG. 5 shows a formula for calculating the current vector from two phase current measurements in accordance with the prior art.

This invention makes a two-channel measurement of the current vector using the arrangement of current sensors in FIG. 3. The first safety channel will be termed safety channel A and the second safety channel will be termed safety channel B. The safety sub-system uses the phase current measurements from sensors 307 and 308 to form the current vector for safety channel A using the well-known Clarke transformation from LEONHARD equation (10.4 a) in combination with Kirchoff's current law identity $i_u+i_v+i_w=0$ as shown in FIG. 5.

The current vector for safety channel B is derived from the bus current sensor 306 but here the measurements of the phase currents are discontinuous and are multiplexed through sensor 306 by the inverter bridge 301. This uses the technique of BOYS. For example when IGBTs 321, 332 and 333 are all ON and the remaining IGBTs 322, 323 and 331 are all OFF then the current in sensor 306 is the U phase current with positive polarity. The eight possible states of inverter bridge 301 are shown in FIG. 6 and it will be seen that states $000_2$ and $111_2$, namely all low side IGBTs are ON and all high-side IGBTs are ON respectively, apply no net voltage between the motor phases, these two states are therefore termed zero states and the remaining six states are termed active states.

Figure 6:
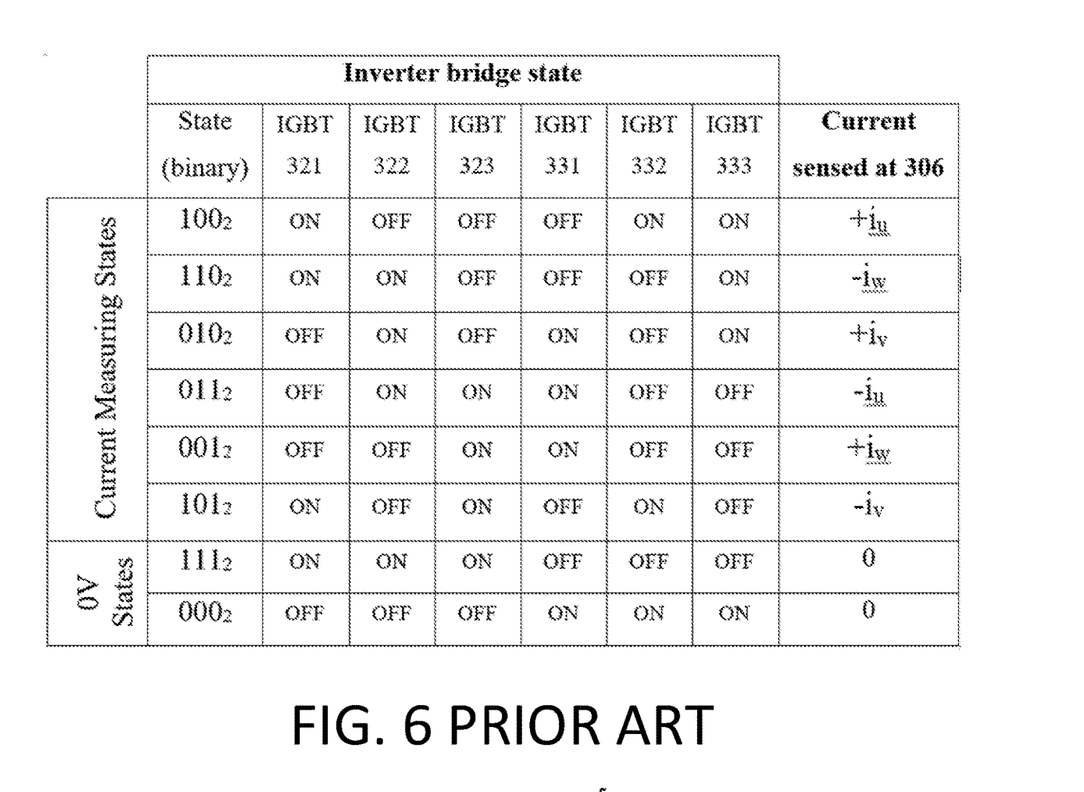
FIG. 6 is a table showing the relationship between the state of the inverter bridge and current flowing in the DC link in accordance with the prior art.

The most common scheme of pulse width modulation in servo drives is for the switching frequency to be fixed and for one phase to switch at a time, therefore the inverter bridge 301 will dwell twice at each of the states shown in FIG. 6 during a PWM cycle. The states are represented as binary numbers. For example, inverter bridge 301 will start at zero state $000_2$ and then switch to either $001_2$ or $010_2$ or $100_2$ and then to $011_2$ or $110_2$ or $101_2$ and then to zero state $111_2$, in the second half of the cycle inverter bridge 301 switches to $011_2$ or $110_2$ or $101_2$ and then $001_2$ or $010_2$ or $100_2$ before returning to the initial zero state $000_2$. Regardless of the exact sequence of states it will be seen that the inverter bridge 301 will dwell at each of the eight states during a PWM cycle and therefore that a measurement of each of the three phase currents is available twice per switching cycle.

Figure 7:
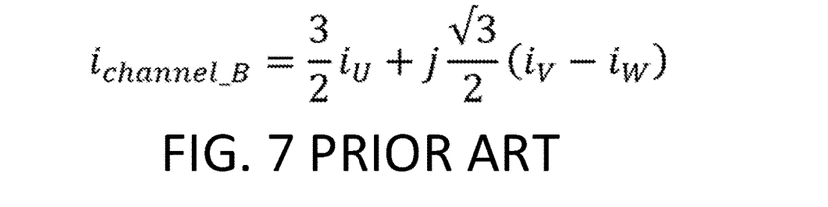
FIG. 7 shows a formula for calculating the current vector from three phase current measurements in accordance with the prior art.

In the first preferred embodiment of this invention, the safety sub-system creates the current vector measurement for safety channel B using the phase current measurements according to the table of FIG. 6 using the formula of FIG. 7 as derived from LEONHARD page 151.

The current vector measurement for safety channel B according to FIG. 7 requires sampling and storing in a respective memory or logic register to be performed for each phase current measurement as they become available through the states of FIG. 6 so that the second measurement of the current vector can be re-constructed from these sequential measurements of the phase currents.

Figure 8:
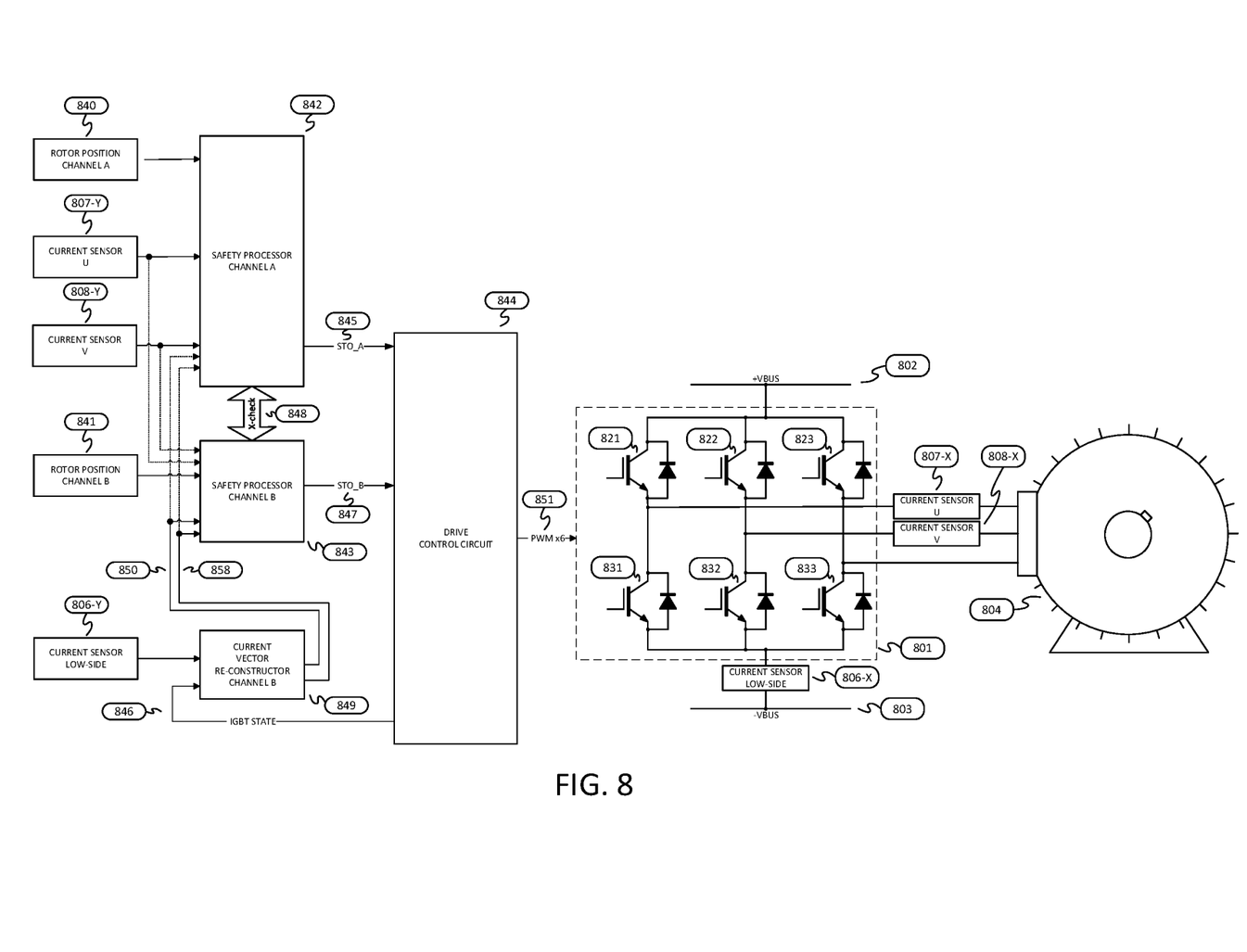
FIG. 8 is a schematic illustration of a first and a third embodiment in accordance with the invention.

The elements of the safety sub-system that are required to implement SLT according to the first embodiment are depicted in FIG. 8. 806-X corresponds to the input section of the current sensor 806 and 806-Y corresponds to the output section of the same sensor. The same input-output nomenclature is applied to current sensors 807 and 808.

The current vector re-constructor circuit 849 is supplied with two input signals; the bus current signal from sensor 806 and a set of signals 846 that represent the state of the inverter bridge 801. The set of signals 851 that controls the IGBT bridge 801 can also serve as set of signals 846 that represent the state of the inverter bridge 801. The current vector re-constructor circuit 849 uses the formula of FIG. 7 and the relationships of FIG. 6 to create a pair of signals 850 that represents the current vector measurement for safety channel B and a signal 858 that indicates that the re-constructed current vector is valid. The current vector re-constructor circuit 849 uses sampling and storing, i.e. sample and hold action but implemented using digital circuitry, for each phase current measurement as they become available through the states of FIG. 6.

Element 844 implements the drive control circuit, this includes commutation, current loop closure, PWM generation and a switching power supply for the control circuit however FIG. 8 does not further illustrate these elements in order to present a clear view of the distinctive aspects of the invention.

There is a safety processor 842 and 843 for each of the two safety channels A and B. This fulfils the architectural requirements of 'Basic subsystem architecture D' in IEC 62061 or 'Category 3 or 4' in ISO 13849; the torque is evaluated independently on each safety channel and compared against limit values to implement SLT. The calculation of the motor torque requires each safety processor 842, 843 to rotate the current vector measurement into the frame of reference of the rotor as per LEONHARD equation (14.4) and for this reason each safety processor 842, 843 is also supplied with an independent measurement 840 and 841 of the rotor position. Signals 840 and 841 are equivalently provided either from two, independent position sensors or alternatively from a safe position sensor having two independent outputs; in both cases the position sensor is aligned with the rotor flux vector during manufacture. There is also cross-checking between the safety processors 842 and 843 using intercommunication signal set 848.

The cross-checking compares the position measurements 840 and 841 for the two channels and also compares the computed torque values for the two channels; a discrepancy beyond a prescribed limit is considered to be a fault and the STO signals 845 and 847 will be de-energized thereby shutting down the drive 844.

The cross-checking also compares the computed torque values for the two channels and again a discrepancy beyond a prescribed limit is considered to be a fault and the STO signals 845 and 847 will be de-energized thereby shutting down the drive 844.

The channel A safety processor 842 receives data from the current sensors 807 and 808 and the channel A rotor position measurement 840. It can optionally, in order to achieve greater diagnostic coverage, also receive data from the B channel's re-constructed current vector 850 and valid signal 858. The channel A safety processor 842 has an output 845, labelled STO_A, that can shut-down the PWM via the drive control circuit 844.

The channel B safety processor 843 receives the channel B re-constructed current vector and the channel B rotor position measurement 841. It can optionally, for greater diagnostic coverage, also receive data from the channel A current sensors 807 and 808. The channel B safety processor 843 has an output 847, labelled STO_B, that can shut-down the PWM via the drive control circuit 844.

One practical realization of the current vector re-constructor circuit 849 would be as a microcontroller, an example of suitable microcontroller is the STM32F031K6T7 which has 16 kB of flash memory, 4 k bytes of SRAM, a built-in 48 MHz clock generator, serial ports and a 12-bit ADC: such a device can implement the re-constructor 849 as a single chip for only $1. An FPGA realization of the current vector re-constructor circuit 849 is alternatively possible and might be preferred—especially where it can be combined with an FPGA implementation of the drive control circuit 844.

Safety standards such as IEC 62061 require that the two safety channels and drive control circuit 844 are separated by protective barriers so that the failure of one these three sub-circuits will not compromise functional safety, that is at least one of the safety channels will remain operational. For the sake of clarity, the protective barriers are not illustrated in FIG. 8 but the protective barriers will be present in the pathway of signals 845, 847, 848, 849 and also 850 and 858 where these signals reach the channel A safety processor 842. The protective barriers can be implemented as impedances, opto-isolators, digital isolators and even as moat of unused gates within a logic device. Therefore the implementation of FIG. 8 can be varied to combine say the current re-constructor 849 with the channel B safety processor 843, and/or to combine the channel A safety processor 842 with the drive circuit in an FPGA.

The current measurements derived from sensor 806-X using the relationships of FIG. 6 are not simultaneous, thus when a measurement of say the U phase current is made it will be stale by the time that the measurement of the V phase current is made. This combination of fresh and stale current measurements in the current vector re-constructor circuit 849 will distort the estimate 850 of the current vector used by safety channel B and consequently when the safety sub-system monitors the difference between the current vectors of the A and B channels it will be necessary to accommodate this distortion as an expected discrepancy, thereby limiting the smallest torque threshold that can be reliably detected. A reduction in the distortion can be obtained by using the two most recent phase current measurements to reconstruct the third current using by making use of the identity $i_u+i_v+i_w=0$ but some distortion of safety channel B current vector remains.

Figure 9:
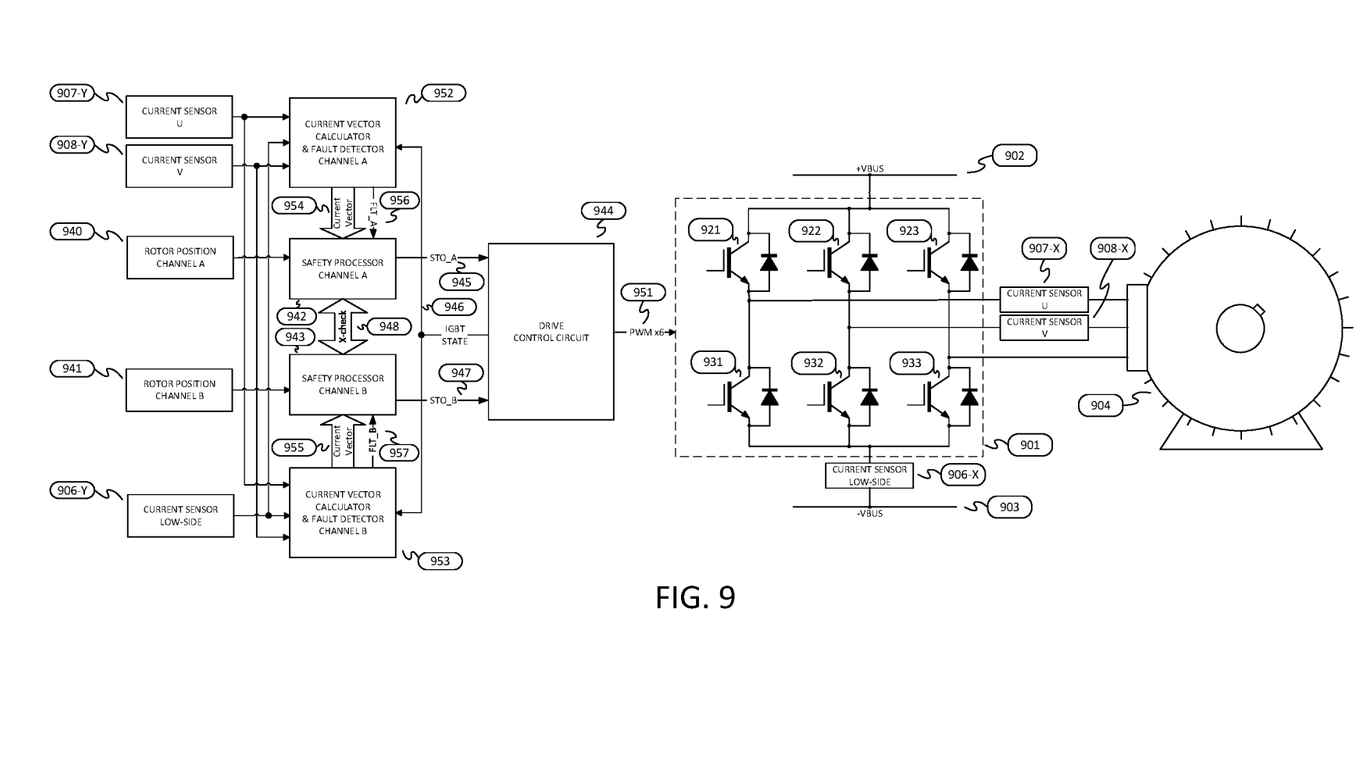
FIG. 9 is a schematic illustration of a second and a fourth embodiment in accordance with the invention.

The requirement for a two-channel measurement in a 1oo2 safety system is fulfilled in the first preferred embodiment using a duplicate set of independent measurements. However it is possible, in a safety system that fails to an inoperative, safe state, to interpret the requirement for two channels not as two, duplicate sets of measurements but rather as a first set of a measurements in combination with a second set of measurements that, although not usable in their own right, independently indicate the validity of the first measurements. This latter approach is used in the second preferred embodiment of this invention as shown in FIG. 9. The second preferred embodiment eliminates the problem of distortion in the reconstructed current vector 850 of FIG. 8. Rather than assemble a second current vector to compare with the first current vector, the second preferred embodiment instead compares the phase currents from the two sources whenever the data from sensor 906-Y is fresh and therefore accurate.

The measurement from the U phase current sensor at 907-Y can be compared with the measurement from bus current sensor at 906-Y in states $100_2$ and $011_2$. In the latter state the current sensed current from 906-Y must be inverted.

The measurement from the V phase current sensor at 908-Y can be compared with the measurement from bus current sensor at 906-Y in states $010_2$ and $101_2$. In the latter state the current sensed current from 906-Y must be inverted.

The measurements from the U phase current sensors at 907-Y from the V phase current sensor at 908-Y are added together ($-i_w=i_u+i_v$) before comparing with the measurement from bus current sensor at 906-Y in states $110_2$ and $001_2$. In the latter state the current sensed current from 906-Y must be inverted.

The above three actions eliminate the problem of the distortion of safety channel B current vector found in the first embodiment by dispensing with safety channel B current vector altogether.

The implementation of SLT in FIG. 9 retains the same general structure and many of the elements of FIG. 8. The reference numerals of FIG. 9 are consistent with those of FIG. 8, thus for example the drive control circuit in 944 in FIG. 9 is the same as the control circuit in 844 in FIG. 8. The description of FIG. 9 will therefore concentrate only on those elements that are different from FIG. 8.

Safety channel A is equipped with a current vector calculator 952 whose inputs are the inverter bridge state 946, a measurement of the DC link current 906-Y, a measurement of the U phase current 907-Y and a measurement of the V phase current 908-Y. The current vector calculator 952 uses input signals 907-Y and the 908-Y to compute the stator current vector output 954. Shortly after each change of inverter bridge state 946, the current vector calculator 952 digitizes and measures the bus current signal from sensor 906-Y and the U and V phase currents from sensors 907-Y and 908-Y, the W phase current is also computed from $+i_w=-i_u-i_v$. In the case of inverter bridge states $000_2$ and $111_2$—namely the zero states—no further action is taken but for all other states the instantaneous value of the bus current signal from sensor 906-Y is checked by the current vector calculator 952 against the corresponding instantaneous value of phase current according to FIG. 6. The current vector calculator 952 declares a fault at output 956 when the two estimates of phase currents diverge by more than a prescribed limit.

Safety channel B is likewise is equipped with a current vector calculator 953 whose inputs, outputs and operation are the same as the channel A current vector calculator 952.

Each safety processor 942 and 943 computes the motor torque from the phase current measurements 954 and 955 in combination with the respective position measurement 940 and 941 for the respective safety channel. Note that this calculation can take place at any time, it will be valid regardless of switching state of the inverter bridge 901.

Each safety processor 942 and 943 is also notified of errors in the current measurement via signals 956 and 957. If either safety processor 942 and 943 detects a discrepancy from the other processor or that the torque has exceeded the prescribed threshold of the SLT safety function, or that there has been an error in the current measurement, then either safety processor 942 and 943 can shut-down the output drive control circuit 944 using their respective STO control signals 945 and 947.

Both the first and second embodiments combine a two-channel measurement of rotor position with a two-channel measurement of the current vector to obtain a two-channel measurement of torque. The torque measurement can be a positive torque or a negative torque and this has the advantage that the computed torque can be compared against independent positive and negative limit values in order to implement SLT. This is of practical value; consider a machine where a gravity loaded axis is monitored using SLT to avoid crushing an operator's limb, in this machine the downward direction torque threshold would be low whereas the upward torque threshold must be higher to allow the machine to retract in the vertical direction.

However there is also a class of applications where the polarity of the torque is unimportant, an example would be the turntable axis of a robot; here a crushing hazard can be protected against using symmetrical torque thresholds because there is no need to retract against a gravitational load. If the polarity of the applied torque is unimportant then the first and second preferred embodiments can be simplified and this leads to the third and fourth preferred embodiments.

The third preferred embodiment the same as the first preferred embodiment as illustrated in FIG. 8 but with the removal of safety channel A rotor position measurement 840 and safety channel B rotor position measurement 841; it is so similar to FIG. 8 that no further diagram is given. Each safety processor 842 and 843, rather than computing torque, instead computes the magnitude of the channel A current vector and the magnitude of the channel B current vector and compares the two magnitudes against the SLT limit values. The motor torque is proportional to the sine of the angle between the rotor flux vector and the current vector, the worst case is that the angle is ninety degrees and that the sine is unity thereby yielding the maximum torque. For all other angles the resultant torque will be a lesser value and therefore simply using the magnitude of the current vector will over-estimate the motor current; an over-estimate will trigger SLT at too low a torque value but note that this is a safe condition.

It is advantageous to create a product that implements both the first and third preferred embodiments in a unified design; this would allow the user the option of connecting to a safety rated encoder if he requires signed limitation of the torque according to the first embodiment or alternatively of connection to a standard encoder if unsigned limitation of the torque according to the third embodiment is sufficient. The hardware of FIG. 8 can implement either the first or the third preferred embodiments, it requires configuration to select the appropriate algorithm.

Similarly, the fourth preferred embodiment is the same as the second preferred embodiment as illustrated in FIG. 9 but with the removal of safety channel A rotor position measurement 940 and safety channel B rotor position measurement 941; it is so similar to FIG. 9 that no further diagram is given. Each safety processor 942 and 943, rather than computing torque, instead computes the magnitude of the channel A current vector and the magnitude of the channel B current vector and compares the two magnitudes against the SLT limit values.

It is advantageous to create a product that implements both the second and fourth preferred embodiments in a unified design; this would allow the user the option of connecting to a safety rated encoder if he requires signed limitation of the torque according to the first embodiment or alternatively of connection to a standard encoder if unsigned limitation of the torque according to the third embodiment is sufficient. The hardware of FIG. 9 can implement either the second or the fourth preferred embodiments, it requires configuration to select the appropriate algorithm.

Figure 10:
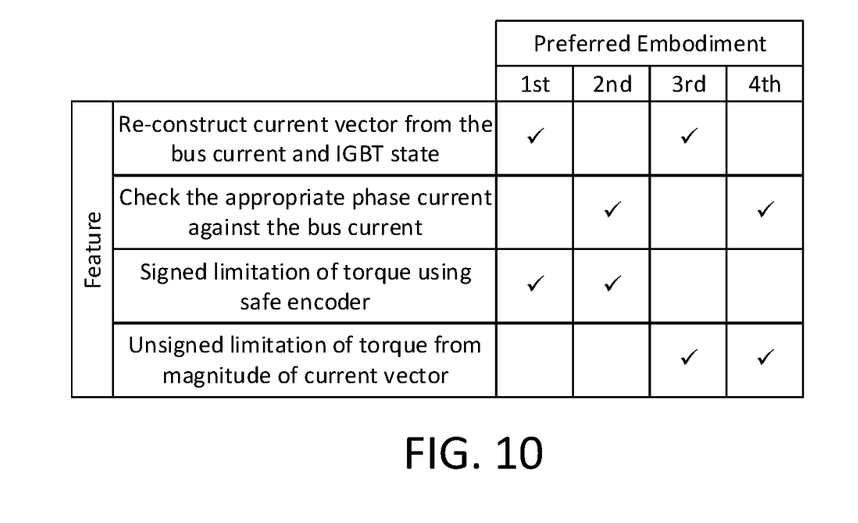
FIG. 10 shows a map of preferred embodiments of the invention against features.

To summarize, all four preferred embodiments use the measurement of the bus current in the various inverter bridge states either to create a measurement of the current vector for the channel B or else to confirm that the measurement of the current vector from two sensors in series with the motor phases are correct. There are numerous possible variations on the hardware implementation and it would indeed be possible to implement all four embodiments in a single design; this would allow SLT to be implemented with or without safe position feedback. All four preferred embodiments use a set of current sensors that is already present in many servo drive designs. A map of preferred embodiment against feature is provided in FIG. 10.

All four preferred embodiments require deducing the phase current from the bus current and the inverter bridge state. There are two abnormal conditions wherein a timely measurement of each phase current will not be available at a rate of twice per PWM switching cycle from the bus current sensor 306 or 806 or 906.

The first abnormal condition is when the servo drive is on but is applying no net voltage, the inverter bridge 301 will cycle between the zero states $000_2$ and $111_2$ wherein it can be seen from FIG. 6 that no current measurements are available from sensor 306. A variant of this first abnormal condition is when the net output voltage is so low that, although the inverter sequences through all states, the dwell time in the states other than $000_2$ and $111_2$ is too short to allow a useful measurement of the respective phase current.

The dwell time must be long enough to allow transient effects, such as the impulse current flowing into stray capacitances and diode recovery currents, to decay. Therefore a practical minimum dwell time is on the order of 5 μs and in the first abnormal condition this may not be fulfilled. To overcome this problem, the drive circuit 844 or 944 is algorithmically altered to artificially prolong the dwell times that are present or to insert current measuring states of adequate dwell times that would otherwise be absent when the required dwell times have not occurred naturally through closed-loop control. The term 'prolongation' will cover both cases. This prolongation can be performed entirely in logic gates or by using software. These artificial dwell times will cause little disturbance to the torque loop and their impact can optionally be reduced by adding them as complementary state pairs one shortly after the other; for example inverter state $100_2$ followed shortly afterwards by inverter state $011_2$ will balance the net applied voltage of the disturbance and therefore lessen the resulting torque perturbation. In the case of the second and fourth embodiments the rate of the comparison between the two sources of current measurement, i.e. the rate of diagnosis, is not required to be very frequent, let us say every 120 ms, and therefore the artificial dwell times are only required at intervals of 40 ms, one phase at a time, to confirm the correct operation of both phase current sensors 807/907 and 808/908.

The second abnormal condition occurs at high rotary speeds when the servo drive has insufficient bus voltage to fully control the phase currents; under these circumstances the PWM saturates and the drive is in what is called quasi-squarewave operation, the inverter bridge 301 will progress through a sequence such as $101_2 \rightarrow 100_2 \rightarrow 110_2 \rightarrow 010_2 \rightarrow 011_2 \rightarrow 001_2$ and then repeat but at the fundamental frequency of the current rather than at the PWM switching frequency, e.g. 100 Hz rather than 16 kHz. In this second abnormal condition a measurement of current is available for all three currents but at a rate much less than twice the PWM switching frequency. However this rate of 100 Hz is frequent enough to check the two current measurements in the case of the second and fourth embodiments, whereas the first and third embodiments will require artificial dwell times to be inserted. In summary all four embodiments can operate despite this second abnormal condition.

In the first and third preferred embodiments the drive circuit 844 is responsible for ensuring that the dwell times of the IGBT inverter state 846 are long enough to allow valid current measurements to be made. The current vector re-constructor circuit 849 will indicate 858 when the re-constructed current vector 850 is invalid as a result of insufficiently long dwell times 846 and thereby cause safety processor 842 and optionally safety processor 843 to put the drive in STO using signals STO_B 847 and optionally STO_A 845. This division of responsibilities allows the drive control circuit 844 to be wholly non-safe, that is designed and maintained without the constraints of safe processes, whereas the current re-constructor circuit 949 is part of the safety system.

Similarly, in the second and fourth preferred embodiments the drive circuit 944 is responsible for ensuring that the dwell times of the IGBT inverter state 946 are long enough to allow valid current measurements to be made. The current vector calculator and fault detector circuits 952 and 953 will respectively indicate 956 and 957 when either re-constructed current vector 954 or 955 is invalid as a result of insufficiently long dwell times 946 and thereby cause either or both safety processors 942 and 943 to put the drive in STO using signals STO_A 945 and/or STO_B 947. This division of responsibilities allows the drive control circuit 944 to be wholly non-safe, that is designed and maintained without the constraints of safe processes, whereas the current vector calculator circuits 952 and 953 are part of the safety system.

The two safety processors 842/942 and 843/943 are typically implemented as micro-controllers. However the term 'safety processor' is technologically neutral and could alternatively be implemented using FPGA gates or as FPGA soft processors. The two safety processors 842/942 and 843/943 could be combined into a dual lock-step safety processor or into a triple mode redundant safety processor without changing the essential concept of the invention. The current re-constructor 849 and B channel safety processor 843 could be combined into a single device. Similarly the drive control circuit 844 could be combined into a single device with either safety processor for safety channel A 842 or the safety processor for safety channel B 843. Implementations of FIG. 8 using one or more FPGAs are also possible.

This specification has avoided excessive generalizations in order to aid understanding but this should not be interpreted restrictively. There are many minor variations that do not change the essentials of the invention, including but not limited to sensing the high side bus current rather than the low side bus current 106, sensing the V 108 and W 108 phase currents rather than the U 107 and V 108 phase currents. The exact partitioning of functionality between the channel B current vector calculator 952/849 and the channel B safety processor 843/943 can be varied to suit the availability of components and the location of isolation barriers. Similar remarks apply to A channel elements, moreover there is no normative requirement for the two safety channels A and B to be symmetrical. Signal paths 954, 955, 956, 957 can be transmitted via black channels and with or without isolation. Further redundant measurements of the current vector are possible using an additional bus current sensor and/or phase current sensors. It will be understood by those of ordinary skill in the art that various changes may be made and equivalents may be substituted for elements without departing form the scope of the invention. In addition, many modifications may be made to adapt a particular feature of material to the teachings of the invention without departing from the scope thereof. Therefore, it is intended that the invention not be limited to the particular embodiments disclosed, but that the invention will include all embodiments falling within the scope of the claims.

LIST OF REFERENCE NUMERALS

The last two digits of the reference numerals are consistent between the figures and therefore a condensed list is shown.
101, 201, 301, 401, 801, 901: Three-phase Inverter bridge.
102, 202, 302, 402, 802, 902: Main power rail, positive.
103, 203, 303, 403, 803, 903: Main power rail, negative.
104, 204, 304, 404, 804, 904: Permanent magnet AC servomotor.
160: Current sensor in series with source of the low-side IGBT of the U phase.
161: Current sensor in series with source of the low-side IGBT of the V phase.
162: Current sensor in series with source of the low-side IGBT of the W phase.
306, 406, 806, 906: Low-side DC link current sensor, between negative power rail and the Inverter bridge. In FIG. 8 and FIG. 9 the –X portion shows input section and the –Y section shows output section.
207, 307, 407, 807, 907: Current sensor in series with the U phase of the motor. In FIG. 8 and FIG. 9 the –X portion shows input section and the –Y section shows output section.
208, 308, 408, 808, 908: Current sensor in series with the V phase of the motor. In FIG. 8 and FIG. 9 the –X portion shows input section and the –Y section shows output section.
209: Current sensor in series with the W phase of the motor.
121, 221, 321, 421, 821, 921: High-side IGBT and diode, U phase.
122, 222, 322, 422, 822, 922: High-side IGBT and diode, V phase.
123, 223, 323, 423, 823, 923: High-side IGBT and diode, W phase.
131, 231, 331, 431, 831, 931: Low-side IGBT and diode, U phase.
132, 232, 332, 432, 832, 932: Low-side IGBT and diode, V phase.

133, 233, 333, 433, 833, 933: Low-side IGBT and diode, W phase.
410: Duplicate current sensor in series with the V phase of the motor for second channel of torque measurement.
411: Current sensor in series with the W phase of the motor for second channel of torque measurement.
840, 940: Rotor position signal for safety channel A.
841, 941: Rotor position signal for safety channel B.
842, 942: Safety processor for safety channel A.
843, 943: Safety processor for safety channel B.
844, 944: Servo drive control circuit: servo drive functions not related to safety, closes torque and optionally velocity and position loops, commutates motors and other functions.
845, 945: Safe torque-off signal from safety channel A safety processor. De-energization causes the drive circuit to disable the inverter bridge.
846, 946: Signal set from the drive control circuit that represents the state of the inverter bridge.
847, 947: Safe torque-off signal from safety channel B safety processor. De-energization causes the drive circuit to disable the inverter bridge.
848, 948: Signal set for communication between the A and B channel safety processors.
849: Sub-circuit that reconstructs the motor current vector from the DC link current.
850: Signal set of the re-constructed current vector.
851, 951: Set of signals to control the Inverter bridge.
858: Signal indicating that the re-constructed current vector is valid.
952: Safety channel A current vector calculator and measurement fault detector circuit.
953: Safety channel B current vector calculator and measurement fault detector circuit.
954: Safety channel A current vector signal set.
955: Safety channel B current vector signal set.
956: Safety channel A current measurement fault signal.
957: Safety channel B current measurement fault signal.

What is claimed is:

1. A torque-limiting safety circuit servo drive for an AC permanent magnet motor, comprising:
   a three-phase inverter bridge fed from a DC bus;
   a drive control circuit for providing pulse-width modulated gate drive signals to the three-phase inverter bridge, the drive control circuit having a first safety channel safe-torque-off input and a second safety channel safe-torque-off input;
   a first safety processor controlling the first safety channel safe-torque-off input of the drive control circuit based upon a first estimate of a motor current vector;
   a second safety processor controlling the second safety channel safe-torque-off input of the drive control circuit based upon a second estimate of the motor current vector;
   a first current sensor detecting current in a first motor phase;
   a second current sensor detecting current in a second motor phase; and
   a third current sensor detecting current in a DC bus;
   wherein the drive control circuit is configured to emit a signal set representing a switching state of the three-phase inverter bridge;
   wherein the drive control circuit is configured to shut down the three-phase inverter bridge responsive to input from either of the first safety processor or the second safety processor; and
   wherein the drive control circuit is configured to modify the switching pattern of the pulse-width modulation, providing lengthy pulse-width modulation dwell time to conduct accurate measurement of phase current using the third current sensor.

2. The torque-limiting safety circuit servo drive according to claim 1, further comprising a current vector re-constructor circuit configured to construct an estimated current vector based on the signal set representing the switching state of the three-phase inverter bridge and a signal set representing a DC link current from the third current sensor.

3. The torque-limiting safety circuit servo drive according to claim 2, wherein the current vector re-constructor circuit is configured to emit a signal set representing the estimated current vector and an error indication, wherein the error indication confirms the accuracy of the current vector estimate.

4. The torque-limiting safety circuit servo drive according to claim 2, wherein current vector distortion is reduced using the two most recent phase current measurements to reconstruct current from the third current sensor using an identity $i_u + i_v + i_w = 0$.

5. The torque-limiting safety circuit servo drive according to claim 1, further comprising a rotor position sensor subsystem configured to supply a first rotor position measurement to the first safety processor and a second rotor position measurement to the second safety processor, wherein the first rotor position measurement is independent of the second rotor position measurement.

6. The torque-limiting safety circuit servo drive according to claim 2, wherein the current vector re-constructor and the second safety processor are combined in a single physical device.

7. The torque-limiting safety circuit servo drive according to claim 2, wherein the first safety processor and the drive circuit are combined in a field programmable gate array.

8. A torque-limiting safety circuit servo drive for an AC permanent magnet motor comprising:
   a three-phase inverter bridge;
   a first current sensor detecting current in a first motor phase;
   a second current sensor detecting current in a second motor phase;
   a third current sensor detecting current in a DC bus;
   a drive control circuit providing pulse-width-modulated gate drive signals to the three-phase inverter bridge, the drive control circuit having a first safety channel safe-torque-off input and a second safety channel safe-torque-off input, the drive control circuit adapted to emit a signal set representing a switching state of the three-phase inverter bridge to modify a pulse-width-modulated switching pattern;
   a first safety processor controlling the first safety channel safe-torque-off input of the drive control circuit;
   a second safety processor controlling the second safety channel safe-torque-off input of the drive control circuit;
   a first current vector calculator and error detector configured to detect a discrepancy based on a signal from the third current sensor and the signal set representing a switching state of the three-phase inverter bridge, said signals compared against the first and second current sensor signals and provide a fault signal to the first safety processor based on the discrepancy; and
   a second current vector calculator and error detector configured to detect a discrepancy based on a signal from the third current sensor and the signal set representing a switching state of the three-phase inverter bridge, said signals compared against the first and second current sensor signals and provide a fault signal to the second safety processor based on said discrepancy;

wherein the drive control circuit is adapted to shut down the three-phase inverter bridge responsive to input from either of the first safety processor or the second safety processor.

9. The torque-limiting safety circuit servo drive according to claim 8, wherein the drive circuit and the safety processor are a single device.

10. The torque-limiting safety circuit servo drive according to claim 8, wherein the drive control circuit is configured to modify the switching pattern of the pulse-width modulation, thereby providing lengthy pulse-width modulation dwell time to conduct accurate measurement of phase current using the third current sensor.

11. The torque-limiting safety circuit servo drive according to claim 8, further comprising a rotor position sensor sub-system configured to supply a first rotor position measurement to the first safety processor and a second rotor position measurement to the second safety processor, wherein the first rotor position measurement is independent of the second rotor position measurement.

12. A torque-limiting safety circuit servo drive for an AC permanent magnet motor, comprising:
a three-phase inverter bridge fed from a DC bus;
a drive control circuit for providing pulse-width modulated gate drive signals to the three-phase inverter bridge, the drive control circuit having a first safety channel safe-torque-off input and a second safety channel safe-torque-off input;
a first safety processor controlling the first safety channel safe-torque-off input of the drive control circuit based upon a first estimate of a motor current vector;
a second safety processor controlling the second safety channel safe-torque-off input of the drive control circuit based upon a second estimate of the motor current vector;
a first current sensor detecting current in a first motor phase;
a second current sensor detecting current in a second motor phase;
a third current sensor detecting current in a DC bus;
a rotor position sensor sub-system configured to supply a first rotor position measurement to the first safety processor; and
a second rotor position measurement to the second safety processor;
wherein the drive control circuit is configured to emit a signal set representing a switching state of the three-phase inverter bridge;
wherein the drive control circuit is configured to shut down the three-phase inverter bridge responsive to input from either of the first safety processor or the second safety processor, and
wherein the first rotor position measurement is independent of the second rotor position measurement.

* * * * *